UNITED STATES PATENT OFFICE 2,206,917

PROCESS FOR PREPARING CYCLOPROPANE

John M. Ort, Rockville Centre, N. Y., assignor to E. R. Squibb & Sons, New York, N. Y., a corporation of New York No Drawing. Application June 23, 1939, Serial No. 280,848

10 Claims. (Cl. 260—666)

This invention relates to, and has for its object the provision of, an improved process for the production of cyclopropane.

Cyclopropane has heretofore been prepared by the treatment of a trimethylene dihalide with a metal reduction agent in aqueous alcohol, e. g. by the reaction of trimethylene dibromide with zinc in about 86% ethanol (Lott and Christiansen, Jour. A. Ph. A., 19 (1930) 341). This procedure has been improved—with respect to reaction time and yield—by effecting the reaction in the presence of a catalyst or activator consisting of a small proportion of a dissolved salt of a metal such as iron, copper, cobalt, nickel, vanadium, chromium or manganese, as described and claimed in the copending application of W. A. Lott, Serial No. 139,987, filed April 30, 1937. These activators, however, were found to decrease in power as the water content of the reaction mixture was increased, and to be less effective when using trimethylene chlorobromide than trimethylene dibromide. It became desirable, therefore, to find more powerful activators, especially activators capable of overcoming the reduced reactivity of the reactants in essentially aqueous reaction media (i. e. media constituted in major proportion, or entirely, of water).

It has been found that the dissolved salts of noble metals, inter alia platinum, gold, and notably silver, are powerful activators for the reduction of trimethylene dihalides to cyclopropane, enabling, for example, the production of cyclopropane at a practical rate of evolution from trimethylene chlorobromide in an essentially-aqueous reaction medium. By "dissolved salts" is meant, of course, salts in solution in the reaction medium. Since these activators—even more than those disclosed in the Lott application, also catalyze the secondary, hydrogen-forming reaction, there should preferably be added to the reaction medium a small proportion of an alkali, notably $Mg(OH)_2$, (as described and claimed in my copending application Serial No. 280,847 filed simultaneously herewith).

The invention is applicable generally to the production of cyclopropane by the reduction of trimethylene dihalides, notably the dibromide and chlorobromide; the utilizable metal reduction agents include, inter alia, zinc, iron and magnesium; the reaction medium may range in composition from the conventional essentially-alcoholic (lower aliphatic alcohol, e. g., methyl, ethyl, or isopropyl) to the essentially-aqueous, and other alkalies may be used in place of $Mg(OH)_2$, for example, $NaOH$, $Ca(OH)_2$ or $Na_2CO_3$.

The dissolved salts of noble metals are effective activators in minute proportion, about 0.1 g. of $AgNO_3$, for example, being an effective activator for 1 kg. zinc dust. The optimum amount of activator is dependent on the temperature, pH, alcohol content and time of reaction, lower temperatures and the presence of a small amount of alcohol being preferred. In view of the small proportion of noble metal salt used and the relatively high cost of the trimethylene dihalide, recovery of the activator from the reaction mixture is not required.

The following examples are illustrative of the invention (the ingredients—especially the noble metal salt—being mixed in the given sequence, and the noble metal salt being added in rather dilute solution, slowly, with stirring):

Example 1

A mixture of the following:

| | | |
|---|---|---|
| Distilled water | cc | 400 |
| 95% ethanol | cc | 40 |
| Zinc dust | g | 200 |
| Aqueous $AgNO_3$ solution containing 0.0175 g. $AgNO_3$ | cc | 335 |
| NaBr | g | 8 |
| Dry $Mg(OH)_2$ | g | 45 | is heated at about 80–90° C. and 454 g. trimethylene dibromide is added slowly so as to produce the desired rate of evolution of cyclopropane; an about 95% yield is obtained, the evolved gases containing less than 2% hydrogen.

Example 2

A mixture of the following:

| | | |
|---|---|---|
| Zinc dust | g | 200 |
| Distilled water | cc | 400 |
| Aqueous $AgNO_3$ solution containing 0.5 g./1000 cc., diluted with 300 cc. distilled water | cc | 270 |
| NaBr | g | 8 |
| $Mg(OH)_2$ | g | 37 |
| Alcohol | cc | 53 | is heated at about 80–90 C. and 454 g. trimethylene chlorobromide is added slowly so as to produce the desired rate of evolution of cyclopropane; a 93% yield is obtained, the evolved gases containing a negligible amount of hydrogen.

Example 3

A mixture of the following:

| | | |
|---|---|---|
| Distilled water | cc | 300 |
| Gold chloride solution containing about 0.05 g. Au | cc | 1 |
| Ethanol | cc | 20 |
| Iron powder | g | 65 |
| NaBr | g | 3 |
| $Mg(OH)_2$ | g | 20 | is heated at about 80–90° C. and 125 g. trimethylene chlorobromide is added slowly so as to produce the desired rate of evolution of cyclopropane; a 56% yield is obtained, the evolved gases containing 12% hydrogen.

Example 4

A mixture of the following:

| | | |
|---|---|---|
| Distilled water | cc | 300 |
| 1% aqueous solution of $AgNO_3$ | cc | 5 |
| Ethanol | cc | 20 |
| Iron powder | g | 65 |
| NaBr | g | 3 |
| $Mg(OH)_2$ | g | 20 | is heated at about 80–90° C. and 95 g. trimethylene chlorobromide is added slowly so as to produce the desired rate of evolution of cyclopropane; a 73% yield is obtained, the evolved gases containing 6% hydrogen.

Example 5

A plant-scale production of cyclopropane is carried out as follows: 90 gallons of distilled water and 240 pounds of zinc dust are placed in a jacketed, internally zinc-coated still and briskly agitated; then 74 g. of $AgNO_3$ dissolved in 25 gallons of distilled water is added gradually to the swirling contents in the still, and then 10 pounds of NaBr is added and dissolved, followed by 45 pounds dry $Mg(OH)_2$ and 8 gallons of 95% ethanol; the still is then closed and steam admitted to the jacket until the temperature of the reaction mixture reaches about 50° C., whereupon the steam is cut off and the slow addition of 400 pounds of trimethylene chlorobromide begun; the reaction being exothermic, cold water is passed into the jacket to prevent the temperature rising above 60° C., and the rate of addition of the chlorobromide is increased periodically until it reaches about 100 pounds per hour. The evolved cyclopropane is recovered in over 83% yield with a low hydrogen content.

The residue in the still is filtered while still warm in order to get the filtrate for bromide recovery, the filtration proceeding smoothly and rapidly despite the presence of $Zn(OH)_2$ and some $Mg(OH)_2$. The $Mg(OH)_2$ in addition greatly reduces the acidity of the reaction mixture and hence also reduces the corrosion of the plant equipment.

The invention may be variously otherwise embodied within the scope of the appended claims.

I claim:

1. The process of preparing cyclopropane which comprises reacting a trimethylene dihalide with a metal reduction agent in the presence of a dissolved salt of a noble metal.

2. The process of preparing cyclopropane which comprises reacting a trimethylene dihalide with a metal reduction agent in an essentially-aqueous reaction medium in the presence of a dissolved salt of a noble metal.

3. The process of preparing cyclopropane which comprises reacting a trimethylene dihalide with a metal reduction agent in the precence of an alkali and of a dissolved salt of a noble metal.

4. The process of preparing cyclopropane which comprises reacting a trimethylene dihalide with a metal reduction agent in an essentially-aqueous reaction medium in the presence of an alkali and of a dissolved salt of a noble metal.

5. The process of preparing cyclopropane which comprises reacting a trimethylene dibromide with a metal reduction agent in an essentially-aqueous reaction medium in the presence of an alkali and of a dissolved salt of a noble metal.

6. The process of preparing cyclopropane which comprises reacting a trimethylene chlorobromide with a metal reduction agent in an essentially-aqueous reaction medium in the presence of an alkali and of a dissolved salt of a noble metal.

7. The process of preparing cyclopropane which comprises reacting a trimethylene dihalide with zinc in the presence of a dissolved salt of a noble metal.

8. The process of preparing cyclopropane which comprises reacting a trimethylene dihalide with zinc in an essentially-aqueous reaction medium in the presence of $Mg(OH)_2$ and of a dissolved salt of a noble metal.

9. The process of preparing cyclopropane which comprises reacting a trimethylene dihalide with zinc in an essentially-aqueous reaction medium in the precence of $Mg(OH)_2$ and of a dissolved silver salt.

10. The process of preparing cyclopropane which comprises reacting a trimethylene dihalide with zinc in an essentially-aqueous reaction mixture in the presence of $Mg(OH)_2$ and of $AgNO_3$.

JOHN M. ORT.